(12) United States Patent
Delaney et al.

(10) Patent No.: US 11,218,377 B2
(45) Date of Patent: Jan. 4, 2022

(54) PREDICTION OF LOSS OF NETWORK CONNECTION AND CACHING OF CONTENT

(71) Applicant: Lenovo (Singapore) Pte. Ltd., Singapore (SG)

(72) Inventors: Mark Patrick Delaney, Raleigh, NC (US); Nathan J. Peterson, Oxford, NC (US); Russell Speight VanBlon, Raleigh, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 113 days.

(21) Appl. No.: 16/577,695

(22) Filed: Sep. 20, 2019

(65) Prior Publication Data
US 2021/0092024 A1    Mar. 25, 2021

(51) Int. Cl.
*H04L 29/08* (2006.01)
*H04L 12/24* (2006.01)

(52) U.S. Cl.
CPC ...... *H04L 41/147* (2013.01); *H04L 29/08819* (2013.01); *H04L 41/0654* (2013.01); *H04L 41/22* (2013.01); *H04L 67/2847* (2013.01)

(58) Field of Classification Search
CPC ............. H04L 41/147; H04L 29/08819; H04L 41/0654; H04L 41/22
See application file for complete search history.

(56) References Cited

U.S. PATENT DOCUMENTS

| | | | |
|---|---|---|---|
| 8,064,934 B2 | 11/2011 | Klassen | |
| 9,760,399 B1* | 9/2017 | Fraser | G06F 9/485 |
| 2003/0236086 A1 | 12/2003 | Litwin | |
| 2006/0002536 A1 | 1/2006 | Ambrose | |
| 2006/0023865 A1 | 2/2006 | Nice et al. | |
| 2006/0052061 A1 | 3/2006 | Klassen et al. | |
| 2007/0130260 A1 | 6/2007 | Weintraub et al. | |
| 2008/0155471 A1 | 6/2008 | Lynn et al. | |
| 2009/0030992 A1 | 1/2009 | Callanan et al. | |
| 2009/0088144 A1 | 4/2009 | Beadle et al. | |
| 2009/0089804 A1 | 4/2009 | Beadle et al. | |
| 2009/0107265 A1 | 4/2009 | Parker et al. | |
| 2009/0131034 A1 | 5/2009 | Klassen et al. | |
| 2011/0231396 A1 | 9/2011 | Dhara et al. | |
| 2011/0269439 A1 | 11/2011 | Griffin | |
| 2012/0094640 A1 | 4/2012 | Klassen et al. | |
| 2012/0274725 A1 | 11/2012 | Robertson | |

(Continued)

OTHER PUBLICATIONS

Mese et al., "Sharing Device Availability", file history of related U.S. Appl. No. 14/307,247.

*Primary Examiner* — Glenford J Madamba
(74) *Attorney, Agent, or Firm* — John M. Rogitz; John L. Rogitz (57) ABSTRACT

In one aspect, an apparatus includes at least one processor and storage accessible to the at least one processor. The storage may include instructions executable by the at least one processor to predict that a device will not have a network connection during a period of time. Based on the prediction, the instructions may also be executable to recommend content to cache at the device in advance of the period of time and/or to automatically cache the content.

20 Claims, 6 Drawing Sheets

(56) References Cited

U.S. PATENT DOCUMENTS

| | | |
|---|---|---|
| 2012/0297305 A1 | 11/2012 | Hehmeyer et al. |
| 2013/0217364 A1 | 8/2013 | Varoglu et al. |
| 2013/0225210 A1 | 8/2013 | Rosener |
| 2014/0108565 A1 | 4/2014 | Griffin et al. |
| 2014/0280491 A1* | 9/2014 | Heron ................. G06Q 20/123 709/203 |
| 2014/0329515 A1 | 11/2014 | Bluvband et al. |
| 2014/0337448 A1 | 11/2014 | Kline et al. |
| 2015/0009273 A1 | 1/2015 | Robertson |
| 2015/0131559 A1 | 5/2015 | Hof et al. |
| 2015/0215413 A1 | 7/2015 | Lindner et al. |
| 2015/0271110 A1 | 9/2015 | Murray |
| 2015/0350457 A1 | 12/2015 | Lauer |
| 2015/0365818 A1* | 12/2015 | Mese ..................... H04W 4/12 370/252 |
| 2016/0014056 A1 | 1/2016 | Griffin |
| 2016/0072955 A1 | 3/2016 | Barkan |
| 2016/0330154 A1 | 11/2016 | Rosen et al. |
| 2018/0007161 A1* | 1/2018 | Hwang .................. H04L 67/12 |
| 2019/0020612 A1 | 1/2019 | Rosen et al. |
| 2019/0095786 A1* | 3/2019 | Carbune ............ G06Q 30/0202 |
| 2019/0166251 A1* | 5/2019 | DeLuca ................. H04W 4/12 |

\* cited by examiner

PREDICTION OF LOSS OF NETWORK CONNECTION AND CACHING OF CONTENT

FIELD

The present application relates to technically inventive, non-routine solutions that are necessarily rooted in computer technology and that produce concrete technical improvements. In particular, the present application relates to prediction of the loss of a network connection at a device and the caching of content.

BACKGROUND

As recognized herein, there are circumstances where an Internet connection may be difficult or impossible to obtain, such as on an airplane flight. There are also areas of the country where cellular Internet coverage still does not extend, such as in many rural areas. However, the present application recognizes that there is still a need to access content and other data over the Internet during such times. There are currently no adequate solutions to the foregoing computer-related, technological problem.

SUMMARY

Accordingly, in one aspect an apparatus includes at least one processor and storage accessible to the at least one processor. The instructions include instructions executable by the at least one processor to predict that a device will not have a network connection during a period of time. Based on the prediction, the instructions are also executable to recommend content to cache at the device in advance of the period of time.

In some implementations, the apparatus may be the device, the device may include a display accessible to the at least one processor, and the instructions may be executable by the at least one processor to recommend the content by presenting an indication regarding the content on the display. The instructions may even be executable by the at least one processor to present a graphical user interface (GUI) on the display, where the GUI may include a prompt asking whether a user would like the device to cache the content at the device and where the indication itself may also be presented on the GUI. In some examples, the GUI may further include a selector that is selectable by the user to provide a command for the device to cache the content at the device.

In other implementations, the apparatus may be a server. In these implementations, the instructions may be executable by the at least one processor to recommend the content by transmitting an indication of the content to the device.

In certain examples, the network connection may include an Internet connection. Also in certain examples, the instructions may be executable to make the prediction based at least in part on data indicated in an electronic calendar accessible to the apparatus. The data may be associated with a particular event indicated in the electronic calendar, the period of time may be indicated in the electronic calendar as associated with the particular event, and the event may be determined to be related to an event type that is associated with not having a network connection.

Additionally, in some implementations the instructions may be executable by the at least one processor to select the content for recommendation based on the length of the period of time and/or based on identification of past instances of content observation.

In another aspect, a method includes determining that a device will not have a network connection during a period of time and, based on the determining, presenting a prompt on an electronic display requesting user input regarding whether the device should download and store content at the device in advance of the period of time.

In some implementations, the determining may be based at least in part on receipt of a communication from a server indicating that the device will not have the network connection during the period of time. The communication may relate to data in an electronic calendar associated with a user, and/or may specify that the device will not have the network connection during the period of time.

Also in some implementations, the method may include presenting a selector on the electronic display along with the prompt, where the selector may be selectable to provide user input for the device to download and store the content at the device in advance of the period of time.

Additionally, in some examples the determining may be based at least in part on a current location of the device.

Also in some examples, the user input may be first user input, and the determining may be based on second user input specifying the period of time. The second user input may be received based on identification of input to a graphical element presented on the electronic display.

In another aspect, a computer readable storage medium (CRSM) that is not a transitory signal includes instructions executable by at least one processor to predict that a device will not have an Internet connection during a period of time. The instructions are also executable to, responsive to the prediction, automatically download content to the device before the beginning of the period of time.

In some examples, the content may be selected for automatic download based on a threshold non-zero number of past correct predictions of content to download being met. Also in some examples, the content that is selected for automatic download may be selected based on the length of the period of time.

The details of present principles, both as to their structure and operation, can best be understood in reference to the accompanying drawings, in which like reference numerals refer to like parts, and in which:

DETAILED DESCRIPTION

The present application relates to devices that may predict when a user will not have a cellular or Wi-Fi Internet connection so that the device can pre-load data relevant to the user for the user to use while there is no connection. Thus, the device may anticipate a network outage and then cache content it would otherwise download or steam later for offline access during the outage.

For example, assume a user is embarking on a flight. According to user's electronic calendar, the user has a 97 minute flight from upcoming. Also assume the user has been listening to a certain podcast for three hours and 46 minutes that same week and is currently listening to episode four. The device may recognize this usage of the podcast and also the calendar entry for the flight to determine a future network outage during the flight and prompt the user regarding whether the user would like the device to cache the remaining episodes in the same podcast beyond episode four for the user to access while the device is offline during the flight. The user may then provide input for the device to cache the remaining episodes and the device may act accordingly.

Thus, it may be appreciated that various types of data may be used for a device to make predictions of the loss of an Internet connection. The data may include calendar data, location data, and even user input when the user knows that he or she will lose Internet service.

Additionally, in some examples an artificial intelligence model employing deep machine learning via an artificial neural network may be used to verify decision logic. The model may learn the user's preferences over time and strengthen future predictions and content recommendations accordingly.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
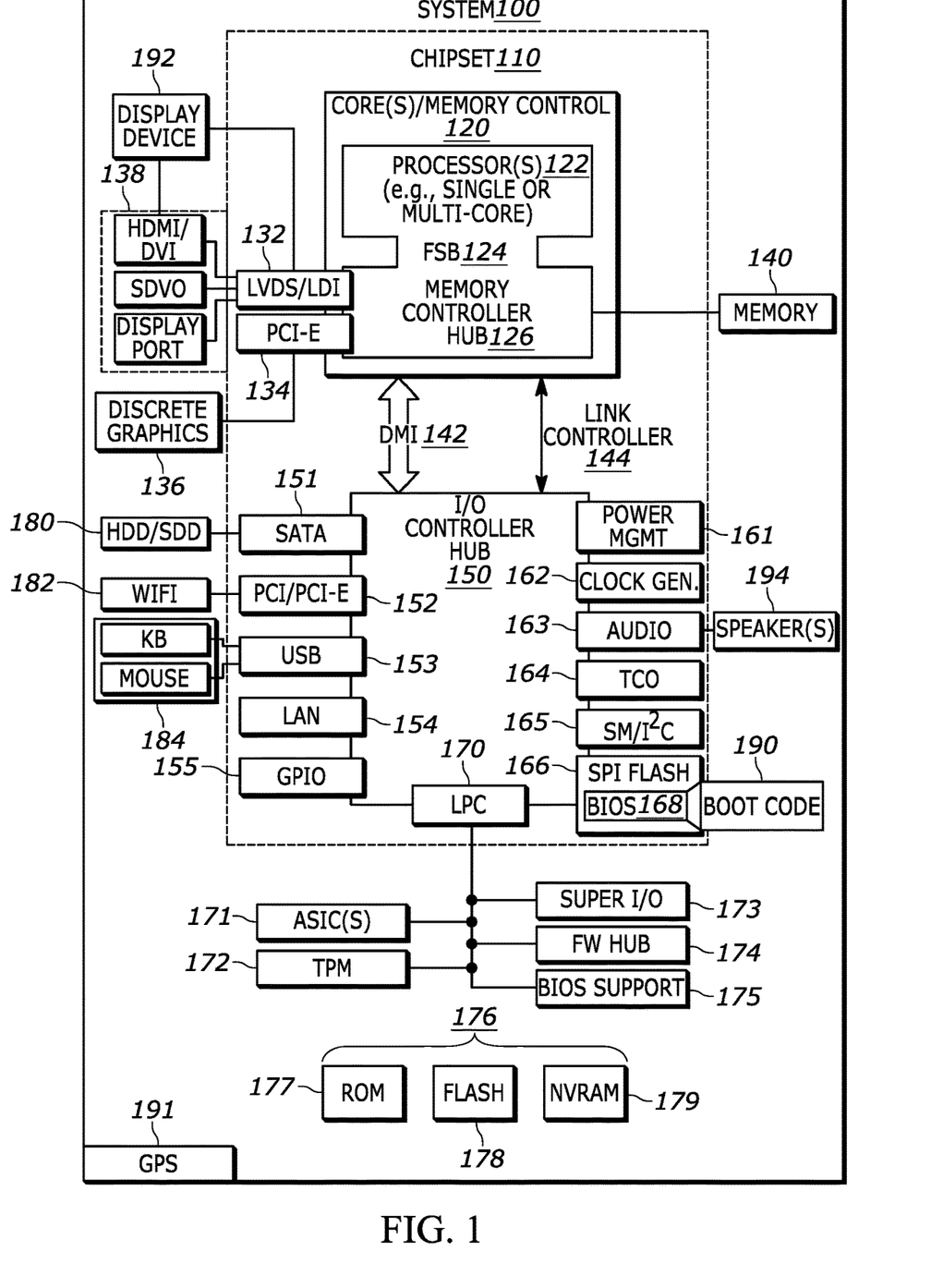
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include a GPS transceiver 191 that is configured to communicate with at least one satellite to receive/identify geographic position information and provide the geographic position information to the processor 122 for determining device location consistent with present principles. However, it is to be understood that another suitable position receiver other than a GPS receiver may be used in accordance with present principles to determine the location of the system 100.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

It is to be understood that an example client device or other machine/computer may include fewer or more features than shown on the system 100 of FIG. 1. In any case, it is to be understood at least based on the foregoing that the system 100 is configured to undertake present principles.

Figure 2:
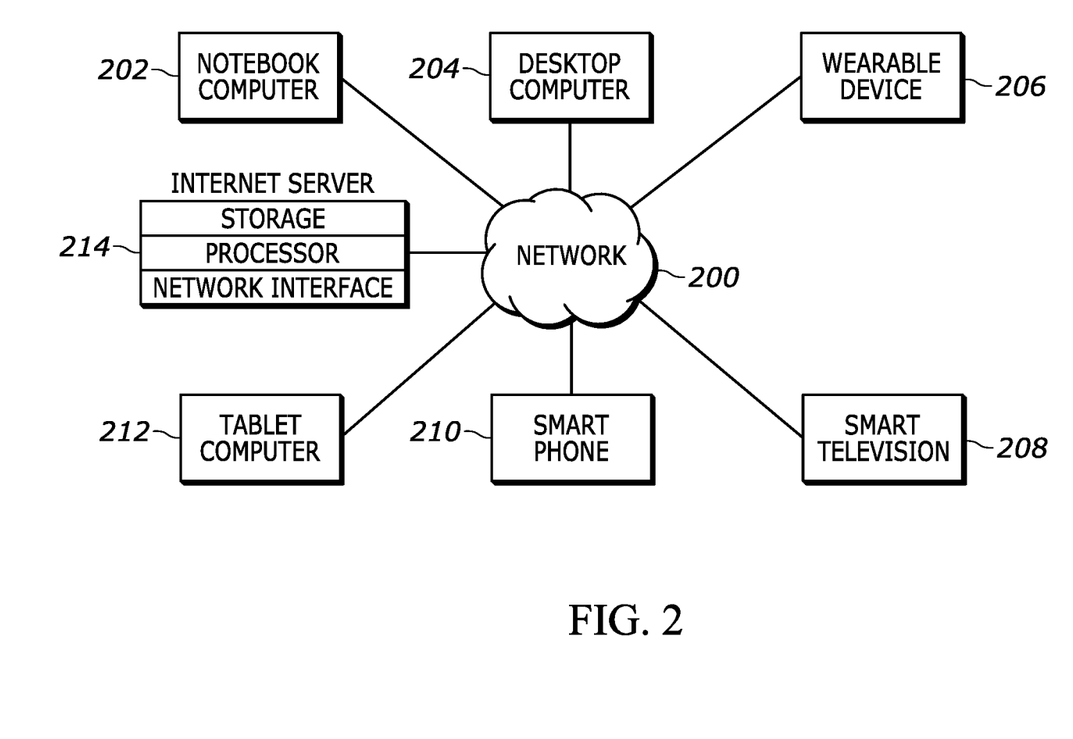
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
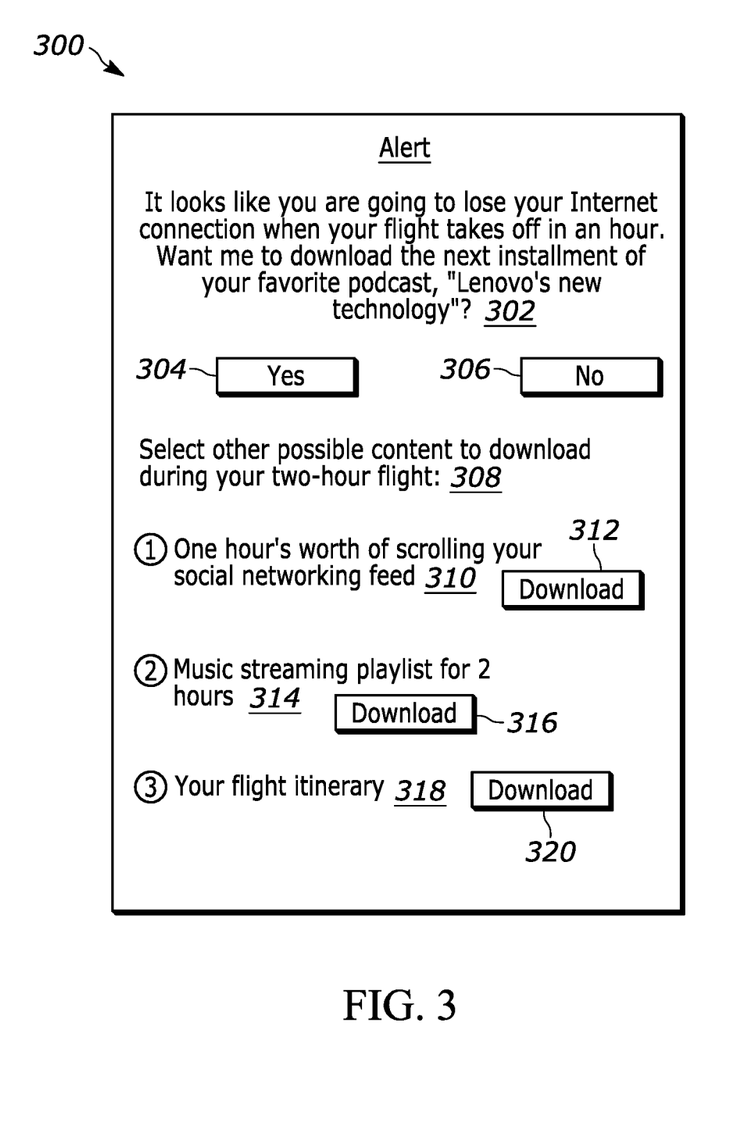
FIG. 3 is an example illustration of a graphical user interface (GUI) that may be presented on a display based on a device predicting that a loss of an Internet/Wi-Fi connection is upcoming consistent with present principles.

Now in reference to FIG. 3, it shows an example graphical user interface (GUI) 300 that may be presented on the display of an end-user's device when the device determines/predicts that the device will not have a network connection during an upcoming period of time that has yet to occur but that the device determines will occur. For instance, if the user is embarking on an airplane flight in the future, the user's smart phone may determine that wireless cellular/Wi-Fi Internet access will be unavailable during the flight. Then responsive to a threshold time being reached that is before the flight is scheduled to take off (e.g., ten minutes before), the smart phone may present the GUI 300.

As shown in FIG. 3, the GUI 300 may include a prompt 302 indicating that the device has predicted that it will lose its ability to access the Internet when a flight identified from the user's electronic calendar begins. The prompt 302 may also ask whether the user wishes the device to download the next episode of the user's favorite podcast in advance of the flight so that the user may listen to the podcast on the flight as it is stored on the device rather than as might be streamed using the Internet as would be possible if the device were not about to lose Internet access.

The podcast may be identified by the device and recommended via the GUI 300 based on the user designating it as a favorite through whatever service provides the podcast. Additionally or alternatively, the podcast recommended to the user may be identified based on it being a most-recent podcast to which the user listened. The next episode may then be recommended for download and storage at the device based on the device determining that the user already listened to the immediately prior episode as may be determined based on communication with the podcast service itself or as tracked at the device. However, if a user had not completed listening to the prior episode, that too may be recommended for download along with the next episode.

In any case, FIG. 3 shows that accompanying the indication of the user's favorite podcast may be a "yes" selector 304 and a "no" selector 306. The selector 304 may be selectable based on touch or mouse input to provide a command to the device for the device to download and store the next episode of the podcast locally at the device in advance of the user's flight. Selector 306 may be selectable to command the device to decline to do so and remove the GUI 300 from presentation on the display.

Additionally, in some examples the GUI 300 may include an indication in the form of a list 308 of still other content the device has identified and recommends as potentially being of interest to the user. The content in the list 308 may be content that is the same as or similar to content the user has observed in the past and these recommendations may be refined over time using an artificial intelligence model (e.g., including one or more deep or convolutional neural networks) that employs machine learning. Thus, in such examples machine learning may be used to lean the user's content preferences (and even content preferences for certain times of day) and infer content the user would likely want to observe in the future during the loss of network connection.

For example, if the user scrolls through the news feed for their social networking account at least once a day, a recommendation 310 of an hour's worth of scrolling of the feed may be presented along with a selector 312 to command the device to download an hour's worth of the feed. A determination of how much content may constitute an hour's worth of scrolling may be user-specific in that the device may track over time how many posts the user typically scrolls through/views on average per time increment. Then assuming the device identifies the user's upcoming flight as being an hour long, the device may provide the recommendation 310 of an hour's worth of scrolling and, responsive to selection of the selector 312, cache an hour's worth of social networking content for the user to scroll based on the average number of posts viewed per time increment.

As another example, the list 308 may include a recommendation 314 for the device to download two hour's worth of music from a service from which the user typically streams music using an Internet connection. Two hours' worth of music may then be downloaded to the device based on selection of the selector 316. In some examples, two hours' worth may be recommended even though the user's flight is only determined to be an hour long so that ample music may be available to the user during the flight should the user decide to skip certain songs. However, alternatively the device may simply download an hour's worth of music by adding up the runtime of upcoming songs that would have been streamed and then downloading an hour's worth of those songs based on their runtimes.

As still another example, the list 308 may include a recommendation 318 to download the user's flight itinerary for the upcoming flight based on selection of the selector 320. The itinerary may be downloaded from the user's email account or a website for the flight's carrier so that the user may view the itinerary whenever he or she wishes during the flight even without an Internet connection. The itinerary itself may be inferred as relevant by an artificial intelligence model given the user is about to embark on a flight indicated in the itinerary.

Figure 4:
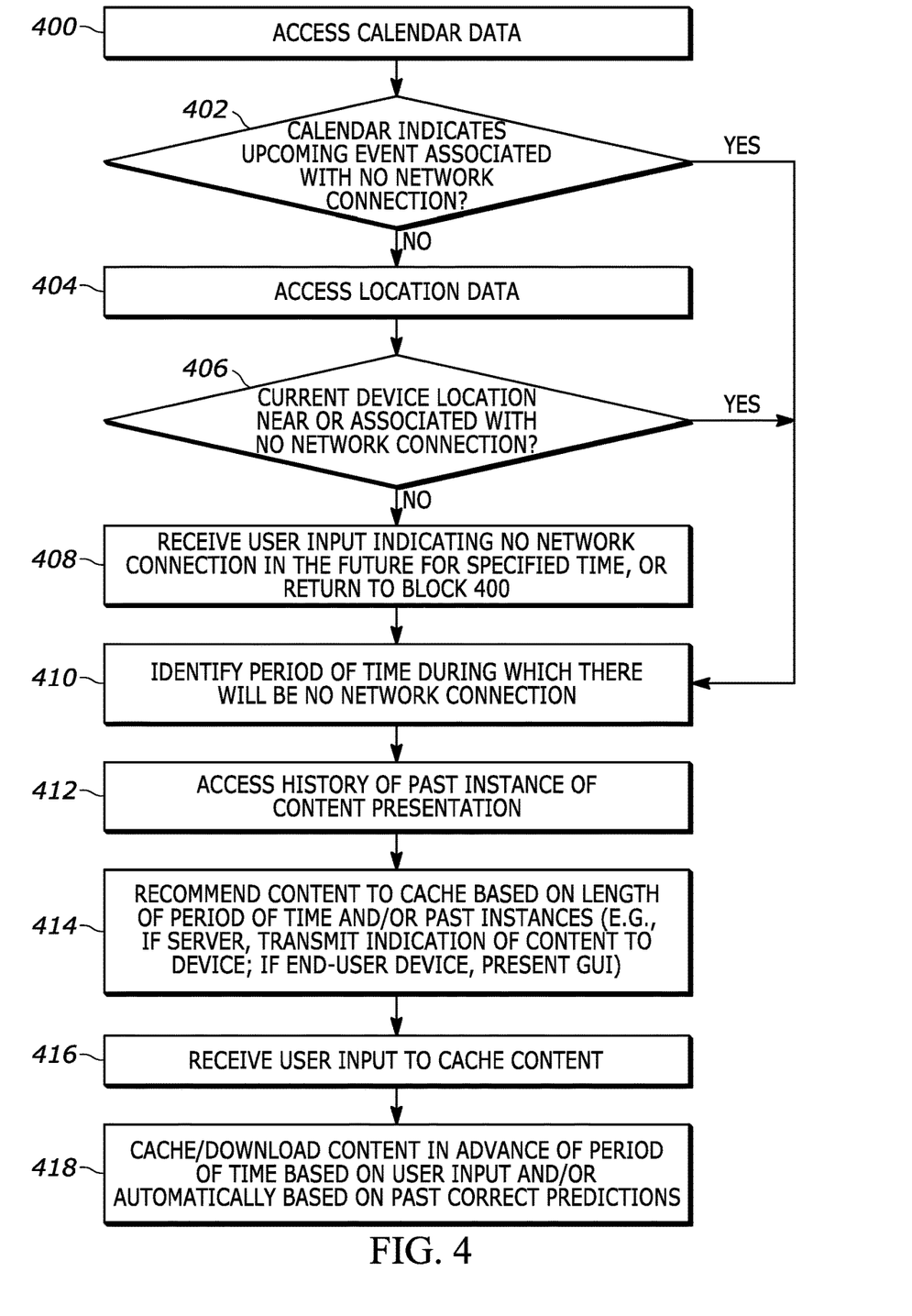
FIG. 4 is a flow chart of an example algorithm to be executed by a device consistent with present principles.

Now describing FIG. 4, it shows example logic that may be executed by a device such as an end-user's device (e.g., the system 100) or a server communicating with an end user's device in accordance with present principles. Note that while cellular Internet coverage is used as an example network connection in the description below, the following may also apply to determining Wi-Fi Internet availability and availability of still other types of networks such as Bluetooth networks and wired local area networks.

Beginning at block 400, the device may access calendar data for an electronic calendar associated with the user, as may be stored in cloud storage hosted on a server or elsewhere.

The logic may then proceed to decision diamond 402 where the device may determine whether the calendar data indicates an upcoming event that is associated with the device not having a network connection. An event may be determined as upcoming if, for example, it is scheduled to begin no more than a threshold non-zero time from a current time, such as an hour and a half before the flight in the example of FIG. 3.

Determining whether the upcoming event is associated with the device not having a network connection may be determined based on identification of a keyword or event type from the calendar data for the upcoming event and then correlation to whether the keyword or event type is associated with not having a network connection. The correlation may be made, for example, using a relational database such as the database of FIG. 7 that will be described later.

Determining whether the event is associated with the device not having a network connection may also be based on identification from the calendar data of a location at which the event is to take place, which may then be used to determine cellular Internet coverage for the area. For instance, a map of cellular Internet coverage for the user's cellular provider may be accessed over the Internet to determine whether the map indicates cellular Internet coverage for the location of the event. An online relational database correlating GPS coordinates or location names to whether cellular Internet service covers the corresponding area may also be accessed to make the determination at diamond 402.

An affirmative determination at diamond 402 may cause the logic to proceed to block 410, where a period of time during which there will be no network connection may be identified. In terms of making this identification based on calendar data, the period of time may be the same as the period of time that the upcoming is scheduled to occur, or the period of time the event is scheduled to occur plus a threshold amount of additional time before and after the event is scheduled to occur (e.g., five minutes before and five minutes after). From block 410 the logic may proceed to block 412, which will be described shortly.

But first referring back to decision diamond 402, responsive to a negative determination the logic may instead proceed to block 404 where the device may access location data indicating a current location of the device. The data may be in the form of GPS coordinates as indicated by a GPS transceiver on the device, as well as data from a proximate cellular tower (e.g., indicating GPS coordinates, city and state, or another way to indicate location).

Also at block 404, in some examples the device may predict a destination toward which the device is moving, as may be indicated via GPS coordinates. For example, the device may use an artificial intelligence model and past user behavior, user interests, and geographic locations within a thirty degree angle left and right of the direction in which the device is moving to infer a possible destination of the user. E.g., a national park may be inferred if the user likes to hike, has an interest in hiking, and is moving toward a national park the device associates with having hiking trails.

From block 404 the logic may then proceed to decision diamond 406. At diamond 406 the device may determine whether its current location (or the predicted future destination) is associated with not having a network connection. For instance, a map of cellular Internet coverage for the user's cellular provider may be accessed over the Internet to determine whether the map indicates cellular Internet coverage for the current location or destination. An online relational database correlating GPS coordinates or location names (such as a particular national park) to whether cellular Internet service covers the corresponding area may also be accessed to make the determination at diamond 406.

An affirmative determination at diamond 406 may cause the logic to proceed to block 410 where a period of time may be identified during which there will be network connection. In terms of making this identification based on location data, the period of time may be the same as a period of time identified from an electronic history of past instances that the user has visited the location, and/or data on how long other people typically spend at that location as may be accessed over the Internet. From block 410 the logic may proceed to block 412, which will be described shortly.

But first, note that a negative determination at diamond 406 may instead cause the logic to proceed to block 408. At block 408 the device may either receive user input indicating that there will be a lack of network connection in the future for a time that may be specified by the user, or revert back to block 400 and proceed therefrom should no user input be received at block 408. Regarding the user input indicating the lack of a network connection, the input may be received based on the user directing input to a graphical element presented on the device's display to indicate no network connection, such as the elements 506 and 510 that will be described below in reference to FIG. 5.

But still in reference to FIG. 4, assuming user input is received at block 408 the logic may then proceed to block 410. At block 410, the device may identify a period of time during which there will be network connection. In terms of making this identification based on user input, the period of time may be the same as a period of time specified by the user that the device will not have a network connection. If a period of time is not specified by the user, then a default period of time may be used. The default period of time may be, for example, one hour as set by the device's manufacturer or an end user (e.g., via input to the GUI 800 of FIG. 8 as will be described later).

From block 410 the logic may proceed to block 412. At block 412 the device may access an electronic history of past instances of content presentation or viewing at the device and/or by the user. The device may then determine other content to recommend for caching at block 414 or to automatically download/cache in advance of the loss of the network connection at block 418 based on the history. In some examples, the device may simply recommend/download the same content or content type as indicated in the history. Also in some examples, the device may determine a next episode or installment in a content series to recommend/download based on identification from the history of the user viewing an immediately prior episode or installment of the series (e.g., podcast series, television series, etc.). Still further, in some examples the device may use an artificial intelligence model that may include a convolutional/recurrent neural network having machine learning capability to make inferences about content that may be of interest to the user for recommendation/download based on inputs such as time of day during which there will be no network connection, types of content the user views at different times of day (e.g., as indicated in the history), content that is trending among the general population, content that is newly available for observation, etc.

Further, note that where multiple different contents may be determined for recommendation/download, the length of the period of time during which there will be no network connection may be used to determine which content to recommend/download. For instance, if the device predicts that a five minute subway ride is upcoming, that is not enough time to listen to an hour-long podcast and thus the device may download five minute's worth of a social networking news feed instead. But if the device predicts that an hour-long flight is upcoming, an hour-long podcast may be recommended/downloaded. Thus, in some examples content may be recommended/downloaded based on the length of time it would take to observe the content corresponding to the length of the expected network loss.

As mentioned above, from block 412 the logic may then proceed to block 414 where the device may actually recommend the determined content. In some instances, the content may be recommended based on it matching the period of time identified at block 410 or exceeding the period of time identified at block 410 by at least a threshold non-zero amount (e.g., five minutes). For example, using the hour-long flight example from FIG. 3, the device may recommend an hour's worth of audio podcasts or an hour and five minute's worth of audio podcasts. Also note that, as indicated above, the content recommended at block 414 may be content identified from past instances of content observation.

Additionally, note in relation to block 414 that in examples where the logic is executed by a server, at block 414 the recommendation may be provided by electronically transmitting data to the end user's device specifying both the predicted period of time of network inaccessibility and the recommended content. The end user's device may then present the recommendations on its display as part of a GUI, such as the GUI 300 described above. However, in examples where the logic is executed by the end user's device itself, the end user's device may either receive the transmission from the server and/or determine for itself content to recommend, and then present indications of the content on its display.

From block 414 the logic may proceed to block 416 where the device may receive user input to download/cache the content. If the logic is executed by a server, the user input may be received via transmission from the end user's device. If the logic is executed by the end user's device itself, the user input may be received based on selection of a selector presented on its display, such as one of the selectors 304, 312, 316, and 320 described above in reference to FIG. 3.

From block 416 the logic may then proceed to block 418. At block 418 the device may download/cache the content selected by the user in advance of the period of time during which there will be no network connection. Additionally or alternatively, if the device is set to automatically download/cache content when a determination is made that there will be no network connection in the future, at block 418 the device may automatically download/cache the content. This automatic downloading/caching of certain content may be based on past correct predictions that the device has made of content of interest to the user and may occur, for example, after a threshold non-zero number of past correct predictions has been made as confirmed by the user (e.g., five past correct predictions). For example, an artificial intelligence model employing machine learning may be used to not only infer relevant content to recommend or automatically download as set forth above but to further improve its determinations of content to recommend/download as time goes on based on certain past recommendations actually being selected by the user (e.g., using a GUI like the GUI 300 described above) and hence confirmed as a correct prediction of relevant content.

Concluding the description of FIG. 4, after block 418 the logic may proceed back to block 400 and proceed therefrom.

Figure 5:
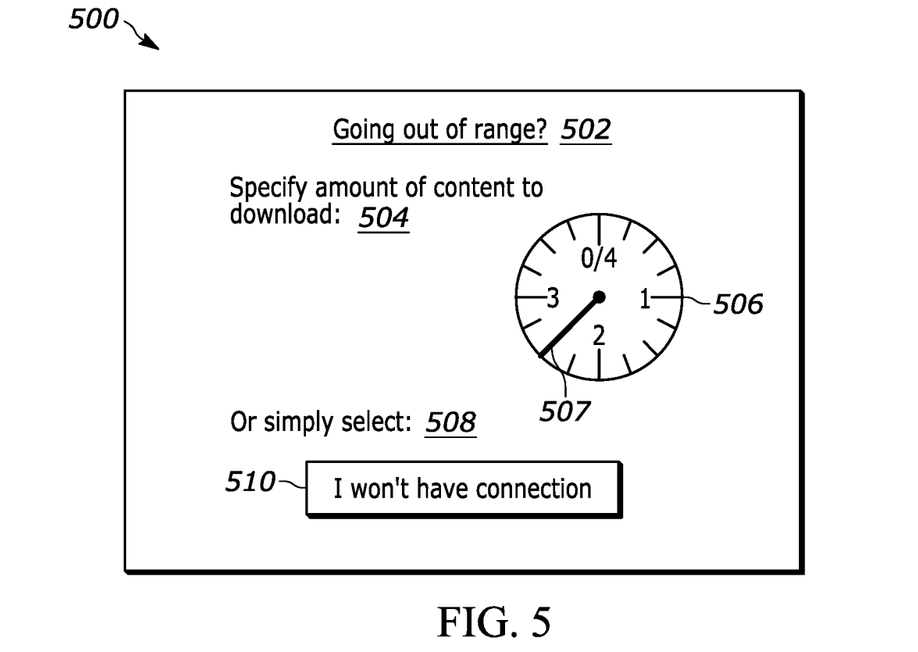
FIG. 5 shows an example GUI that may be presented on a display for a user to provide input that a loss of an Internet/Wi-Fi connection is upcoming consistent with present principles.

Now describing FIG. 5, it shows an example GUI 500 that may be presented on the display of an end user's device consistent with present principles. Specifically, the GUI 500 may be presented based on the user launching an application configured to undertake present principles or the user otherwise providing input to present the GUI 500. The GUI 500 may also be presented responsive to a prediction by the device itself that it will not have a network connection during an upcoming period of time, such as if such a prediction is made but the device is unable to determine a precise period of time during which there will be no network connection.

As shown in FIG. 5, the GUI 500 may include a prompt 502 asking if the user is taking the device out of range of a network through which the Internet may be accessed. The GUI 500 may also include a prompt 504 to specify an amount of content for the device to download in advance of that. The amount of time may be specified in various ways, such as using the dial 506 that is shown to move a dial hand 507 around the dial to specify a time between zero and four hours. In the current example, the dial has been set to two hours and thirty minutes. However, as another example also note that various buttons may also be presented on the GUI 500 that are each designated as associated with a different amount of time so that a user may select from among the buttons to specify the amount of time.

The GUI 500 also shows that a prompt 508 may be presented for the user to select the selector 510 to indicate that the user's device will not have a network connection and to command the device to download content. The selector 510 may be selected in instances where the user may not know precisely how long his/her device will not have a network connection but still wishes that some content be downloaded in advance. As another example, though not shown in FIG. 5 a graphical switch to download content may be flipped/selected to command the device to automatically download content.

Figure 6:
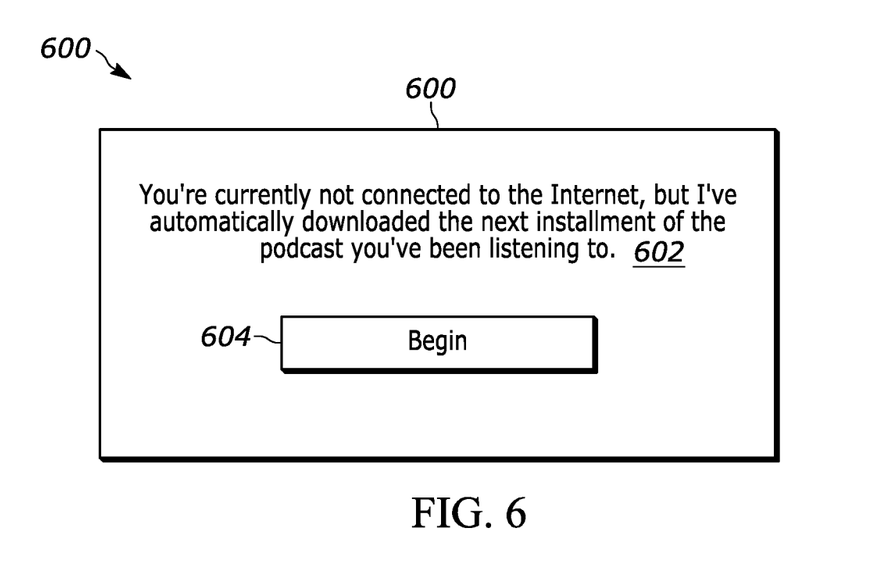
FIG. 6 shows an example GUI that may be presented based on a loss of an Internet/Wi-Fi connection occurring consistent with present principles.

FIG. 6 shows yet another example GUI 600. The GUI 600 may be presented once the user's device has entered a period of no network connection or has entered a location at which the device has no network connection. In some examples, the GUI 600 may be presented simply responsive to one of these situations occurring. In other examples, the GUI 600 may be presented based on these situations occurring but, e.g., only upon the user illuminating the device's display.

As shown in FIG. 6, the GUI 600 may include a prompt 602 indicating that the device currently has no Internet connection and also indicating that content has been automatically downloaded by the device that is determined to be relevant to the user. In the example shown, this content is the next installment of a podcast to which the user has been listening. To listen to the installment as cached at the device, the user may select the selector 604 to initiate playback of the audio of the podcast at the device.

Figure 7:
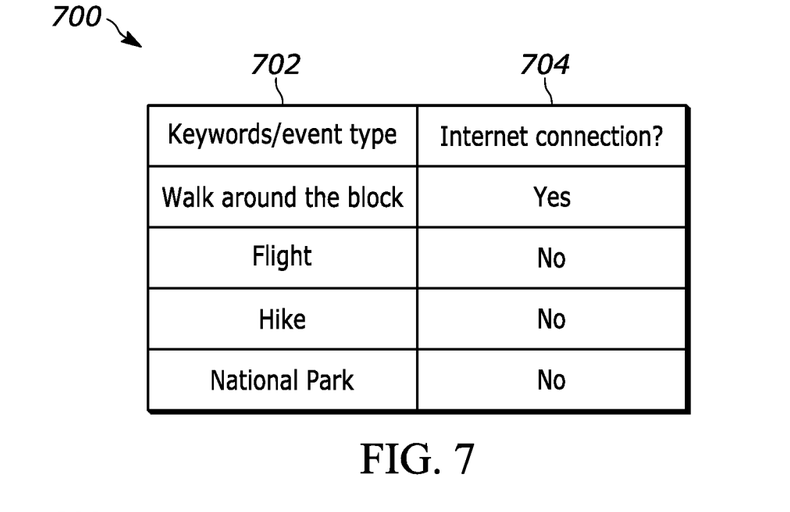
FIG. 7 illustrates an example relational database for use by a device consistent with present principles.

Now describing FIG. 7, it shows an illustration of an example relational database 700 that may be used for determining whether an upcoming event is associated with an end user's device not having a network connection. The determination may be based on a keyword, event type, location, etc. And as indicated above, keywords may be identified from calendar events, location data, or even using voice recognition to identify keywords from audio spoken by the user and detected by the device's microphone (such as if the user mentions the word "hiking", for example).

As shown, the database 700 may include a first column 702 listing keywords, event types, and/or locations. The database 700 may also include a second column 704 of indications of whether an Internet/network connection would exist for the corresponding entry in column 702.

In FIG. 7, as examples, an event type/keywords for a "walk around the block" may be associated with having an Internet connection while "flight" and "hike" may not. As another example, a "national park" location/keyword may be associated with not having an Internet connection.

Figure 8:
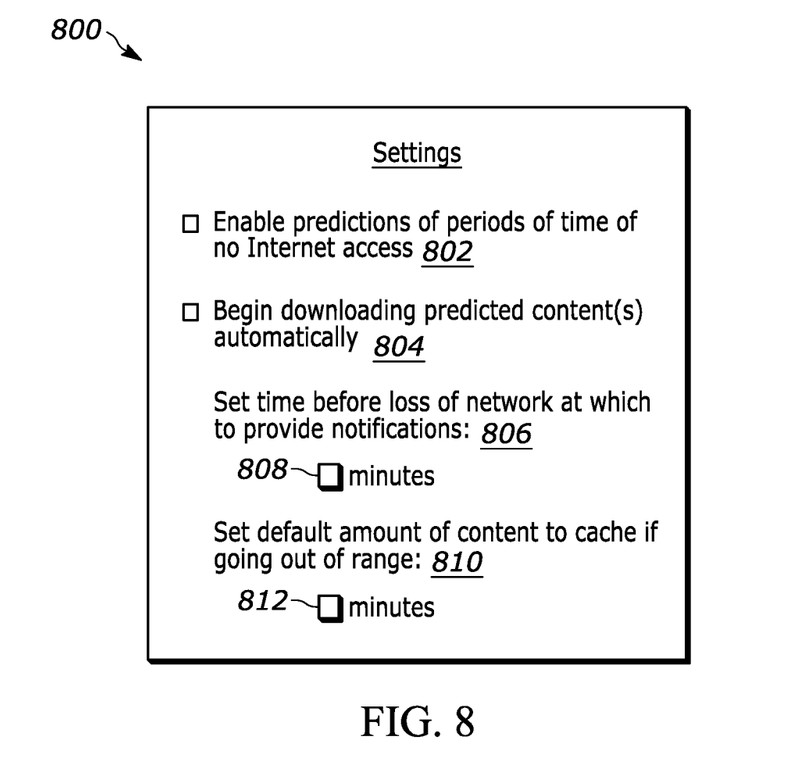
FIG. 8 shows an example GUI for configuring settings of a device for operation consistent with present principles.

Moving on in the detailed description to FIG. 8, it shows an example GUI 800 that may be presented on the display of an end user's device for configuring one or more settings of an application or the device itself that is undertaking present principles. The GUI 800 may include a first option 802 that may be selected using the check box shown next to it to set or enable the application/device to undertake present principles. For instance, the option 802 may be selected to configure the device to undertake the logic of FIG. 4 and present the GUIs of FIGS. 3, 5, and 6.

The GUI 800 may also include a second option 804 that may be selected using the check box shown next to it to set or enable the application/device to automatically download content that the device/application predicts the user may wish to observe while the device does not have an Internet connection. The GUI 800 may further include an option 806 for the end user to set a time before the loss of an Internet connection is determined to begin at which to provide notifications related to the upcoming loss of an Internet connection. For example, one such notification may be the GUI 300 described above in relation to FIG. 3. The user may direct numerical input to box 808 to establish the time in minutes, hours, etc. Thus, the user may set a time before network loss at which the user wishes to be presented with notifications and/or a time that will give the device itself enough time to download content before losing an Internet connection.

As also shown in FIG. 8, the GUI 800 may further include an option 810. The option 810 may be selected to set a default amount of content for the device to cache if it predicts that it will lose an Internet connection. This may be useful, e.g., so that the user does not need to specify an amount of content in a given instance and/or if the device cannot predict a specific period of time that the Internet connection will be lost. Thus, a user may direct numerical input to input box 812 to establish the time in minutes, hours, etc.

It may now be appreciated that present principles provide for an improved computer-based user interface that improves the functionality and ease of use of the devices disclosed herein even when an Internet connection is lost. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus, comprising:
at least one processor; and
storage accessible to the at least one processor and comprising instructions executable by the at least one processor to:
receive data from a microphone accessible to the apparatus;
execute voice recognition using the data to identify one or more keywords spoken by a user;
predict, based on the one or more keywords, that a device will not have a network connection during a period of time; and
based on the prediction, cache content at the device in advance of the period of time.

2. The apparatus of claim 1, wherein the apparatus is the device, wherein the device comprises a display accessible to the at least one processor, and wherein the instructions are executable by the at least one processor to:
recommend the cached content by presenting an indication regarding the cached content on the display.

3. The apparatus of claim 1, wherein the instructions are executable by the at least one processor to:
select the content for caching based on a default period of time.

4. The apparatus of claim 3, wherein the default period of time is used based on the apparatus not being able to predict an actual period of time that the device will not have the network connection.

5. The apparatus of claim 1, wherein the default period of time is predefined prior to selection of the content for caching, the default period of time being predefined based on user input to a graphical user interface (GUI) presented on a display.

6. The apparatus of claim 1, wherein the instructions are executable to:
based on the prediction, recommend the content to cache via a display;
receive user input to cache the content; and
responsive to the user input, cache the content.

7. The apparatus of claim 6, wherein the instructions are executable to:
in response to the display being illuminated and based on the device not having the network connection, recommend the cached content to present at the device.

8. The apparatus of claim 1, wherein the instructions are executable to:
based on the prediction, cache the content without receiving user input, subsequent to the prediction, to cache the content.

9. The apparatus of claim 8, wherein the instructions are executable to:
in response to a display being illuminated and based on the device not having the network connection, recommend the cached content to present at the device.

10. The apparatus of claim 1, wherein the instructions are executable to:
correlate the identified one or more keywords to not having a network connection; and make the prediction based on the identified one or more key words being correlated to not having a network connection.

11. The apparatus of claim 10, wherein the correlation is made using a relational database associating keywords with one or both of: having a network connection, not having a network connection.

12. A method, comprising:
receiving, at an apparatus, data from a microphone;
executing voice recognition using the data to identify one or more keywords spoken by a user;
determining, based on the one or more keywords, that a device will not have a network connection during a period of time; and
based on the determining, presenting a prompt on an electronic display requesting user input regarding whether the device should download and store content in advance of the period of time.

13. The method of claim 12, comprising:
downloading the content responsive to user input for the device to download and store the content in advance of the period of time.

14. The method of claim 13, comprising:
based on the electronic display being illuminated during the period of time for which the device does not have the network connection, present an indication that the downloaded content is available for presentation at the device.

15. The method of claim 12, wherein the content comprises a certain amount of time's worth of scrolling a feed for a social networking account, the certain amount of time's worth of scrolling being determined based on an average number of past posts per time increment through which the user has scrolled in the past.

16. A computer readable storage medium (CRSM) that is not a transitory signal, the computer readable storage medium comprising instructions executable by at least one processor to:
receive data from a microphone accessible to the at least one processor;
execute voice recognition using the data to identify one or more keywords spoken by a user;
determine, based on the one or more keywords, that a device will not have an Internet connection during a period of time; and
based on the determination, cache content at the device in advance of the period of time.

17. The CRSM of claim 16, wherein the instructions are executable to:
determine, in a first instance, that the device will not have an Internet connection during a first period of time;
responsive to the determination in the first instance, recommend first content to download to the device before the first period of time;
receive user input confirming that the first content should be downloaded to the device before the first period of time;
responsive to the user input confirming that the first content should be downloaded to the device before the first period of time, download the first content before the first period of time;
determine, in a second instance after the first instance, that the device will not have an Internet connection during a second period of time after the first period of time; and
responsive to the determination in the second instance and based on the user input confirming that the first content should be downloaded to the device before the first period of time, automatically download second content to the device before the beginning of the second period of time without requesting, based on the determination in the second instance, additional user input to download the second content.

18. The CRSM of claim 17, wherein one or more of the determinations in the first and/or second instances is based at least in part on the execution of voice recognition using the data from the microphone.

19. The CRSM of claim 17, wherein the second content comprises a certain amount of time's worth of scrolling a feed for a social networking account, the certain amount of time's worth of scrolling being at least equal to the second period of time.

20. The CRSM of claim 19, wherein the certain amount of time's worth of scrolling is determined based on one or more of: tracking how many posts the user has scrolled through over one or more periods of time in the past, an average number of social networking posts per time increment that the user has scrolled through in the past.

* * * * *